(12) United States Patent
Koide

(10) Patent No.: US 7,995,101 B2
(45) Date of Patent: Aug. 9, 2011

(54) IMAGE PROCESSING SYSTEM, IMAGE SUPPLY APPARATUS, IMAGE RECEIVING APPARATUS, LIGHTING APPARATUS AND CONTROLLING METHOD THEREFOR

(75) Inventor: Yuji Koide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1518 days.

(21) Appl. No.: 11/268,418

(22) Filed: Nov. 7, 2005

(65) Prior Publication Data

US 2006/0098099 A1 May 11, 2006

(30) Foreign Application Priority Data

Nov. 9, 2004 (JP) ................... 2004-325616

(51) Int. Cl.
*H04N 5/225* (2006.01)
*H05B 41/36* (2006.01)

(52) U.S. Cl. ............. 348/211.2; 348/207.99; 348/207.1; 315/312; 315/318

(58) Field of Classification Search ................ 348/211.2, 348/207.99; 315/318, 312, 362
See application file for complete search history.

(56) References Cited

U.S. PATENT DOCUMENTS

| 5,923,757 A | 7/1999 | Hocker et al. |
| 5,930,368 A | 7/1999 | Hocker et al. |
| 6,067,076 A | 5/2000 | Hocker et al. |
| 6,072,468 A | 6/2000 | Hocker et al. |
| 6,137,476 A | 10/2000 | Hocker et al. |
| 7,309,965 B2 * | 12/2007 | Dowling et al. ............. 315/318 |
| 2001/0052880 A1 | 12/2001 | Kuramoto |
| 2003/0137258 A1 * | 7/2003 | Piepgras et al. ............. 315/291 |
| 2003/0222587 A1 * | 12/2003 | Dowling et al. ............. 315/149 |

FOREIGN PATENT DOCUMENTS

| JP | 09-294107 A | 11/1997 |
| JP | 11-150547 A | 6/1999 |
| JP | 2001-357423 A | 12/2001 |
| JP | 2002-199121 A | 7/2002 |
| JP | 2004-260306 A | 9/2004 |
| JP | 2004-311311 A | 11/2004 |

* cited by examiner

*Primary Examiner* — Sinh Tran
*Assistant Examiner* — Selam Gebriel
(74) *Attorney, Agent, or Firm* — Canon U.S.A., Inc. I.P. Division

(57) ABSTRACT

There is provided an image processing system including an image supply unit arranged to transmit image data by wireless communication, an image receiving unit arranged to receive the image data supplied from the image supply unit, a first lighting unit arranged to illuminate an area in which the wireless communication with the image supply unit is possible, a detecting unit arranged to detect whether the image supply unit is in the area, and a controller arranged to control image communication between the image supply unit and the image receiving unit in accordance with an output of the detecting unit.

31 Claims, 12 Drawing Sheets

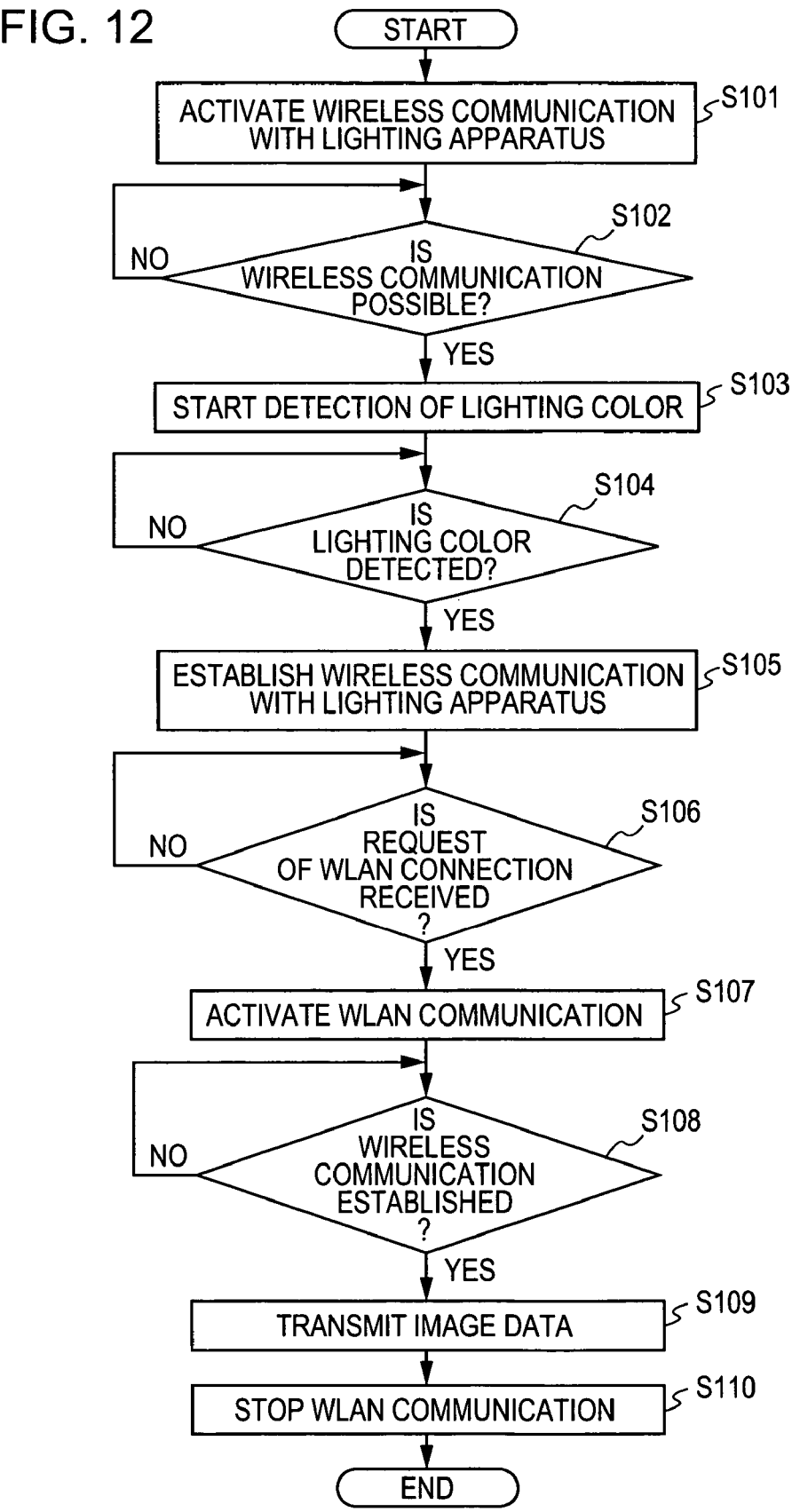

IMAGE PROCESSING SYSTEM, IMAGE SUPPLY APPARATUS, IMAGE RECEIVING APPARATUS, LIGHTING APPARATUS AND CONTROLLING METHOD THEREFOR

BACKGROUND OF THE INVENTION

1. Field of the Invention

The present invention relates to an image processing system and a controlling method for receiving image data from an image supply apparatus (e.g., a digital camera, a digital video camera, etc.) by using wireless communications.

2. Description of the Related Art

Video recorders and televisions adapted to read image information, directly or via an interface (e.g., USB (Universal Serial Bus) etc.), from a memory card and store the image information picked-up by a digital camera on a storage device, such as a hard disk, have been commercially available. Also, the video recorders and the televisions can display the image information on a screen.

However, the operation of attachment and detachment of the memory card or a USB cable is needed for the above-described apparatuses. Accordingly, video cameras, which do not need the operation, adapted to transmit and receive the image information from the memory card based on wireless communication, have been commercially available.

Regarding the transmission and reception of the image data based on the wireless communication, Japanese Patent No. 3422683 discloses a wireless data communication establishment method which makes main wireless connection possible after first stage connection is made by using short-distance wireless communication. Additionally, an imaging apparatus adapted to detect whether the apparatus is in an area which can wireless communicate and transmit the image data in cases where the apparatus is in the area is described in Japanese Patent Laid-Open No. 2004-260306.

However, in the above-described conventional technology, a user cannot determine the area which can communicate the image data, and the user also cannot determine whether the image data is transmitting. Therefore, for example, in cases where it is set up to transmit the image data automatically when the apparatus is in the area which can be communicated, the image data may be transmitted against an intention of a user. Furthermore, since the apparatus has been moved out of the area during the image data transmission, the transmission of the image data may be interrupted against an intention of the user.

SUMMARY OF THE INVENTION

In view of the above problems in the conventional art, the present invention provides an image processing system and a control method therefore which can easily distinguish whether an imaging apparatus is in an area in which wireless communication is possible.

In accordance with an aspect of the present invention, an image processing system includes: an image supply unit arranged to transmit image data by wireless communication; an image receiving unit arranged to receive the image data supplied from the image supply unit; a first lighting unit arranged to illuminate an area in which the wireless communication with the image supply unit is possible; a detecting unit arranged to detect whether the image supply unit is in the area; and a controller arranged to control an image communication between the image supply unit and the image receiving unit in accordance with an output of the detecting unit.

In accordance with another aspect of the present invention, a controlling method of an image processing system which includes an image supply unit arranged to transmit image data by wireless communication, an image receiving unit arranged to receive the image data and a first lighting unit, the controlling method including steps of: an illuminating step of illuminating an area in which the wireless communication with the image supply unit is possible by using the first lighting unit; a detecting step of detecting whether the image supply unit is in the area; and a controlling step of controlling an image communication between the image supply unit and the image receiving unit in accordance with a result of the detecting step.

Further features and advantages of the present invention will become apparent from the following description of exemplary embodiments (with reference to the attached drawings).

BRIEF DESCRIPTION OF THE DRAWINGS

FIG. 12 is a block diagram of the digital camera in the second embodiment of the present invention.

DESCRIPTION OF THE EMBODIMENTS

Exemplary embodiments of the invention will be described in detail below with reference to the accompanying drawings. The relative layout of constitute elements exemplified in the embodiments should appropriately be changed in accordance with the arrangement and conditions of the apparatus to which the present invention is applied. The present invention is not limited to these illustrative embodiments.

First Embodiment

Figure 1:
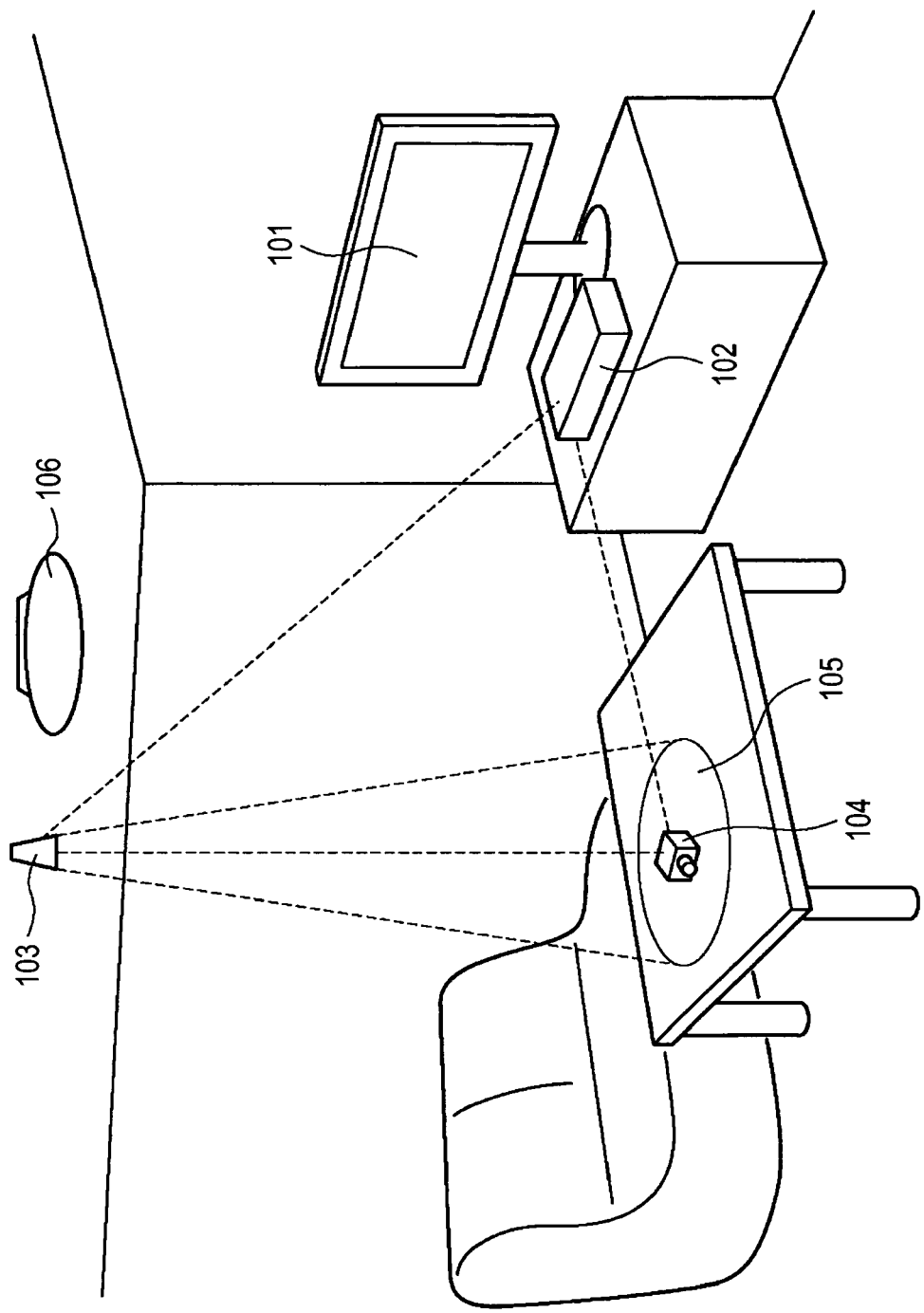
FIG. 1 illustrates an image display system in a first embodiment of the present invention.

FIG. 1 illustrates the image display system in a first embodiment of the present invention.

A display panel of a television 101 and an STB (set top box) 102 including a tuner function for ground wave and BS (broadcasting satellite)/CS (communication satellite) are shown in FIG. 1. Based on a video signal output from the STB 102, an image is displayed on the display 101. A lighting apparatus 103 illuminates the area in which wireless communications are possible. A usual lighting apparatus 106 is also shown in FIG. 1.

The lighting apparatus 103 is equipped with a first wireless communication unit (ZigBee), and can wireless-communicate by using a different channel (e.g., channel 1 (CH1), channel 5 (CH5)) between a digital camera 104 and the STB 102. The first wireless communication unit is in conformity with Zigbee specification. The ZigBee is the set of specifications built around the IEEE 802.15.4 wireless protocol. Therefore, the first wireless communication unit has advantages that a network can be built by the low power and low cost. The digital camera 104 has the first wireless communication unit to wireless-communicate with the lighting apparatus 103 and a second wireless communication unit (e.g., 802.11 WLAN) to wireless-communicate with the STB 102. Additionally, the STB 102 has the first wireless communication unit (ZigBee) to wireless-communicate with the lighting apparatus 103 and the second wireless communication unit (WLAN) to wireless-communicate with the digital camera 104. In the exemplary embodiment described above, the STB 102 wirelessly communicates with the lighting apparatus 103. However, the present invention is not limited to it. For example, the STB 102 may communicate with the lighting apparatus 103 by using a cable, or the STB 102 and lighting apparatus 103 may be formed in a single unit. The channel 1 is a channel for communicating between the lighting apparatus 103 and the digital camera 104. The channel 1 is used in order to communicate information (e.g., ESSID (extended service set identifier), WEP (wired equivalent privacy) key, etc.) for starting the wireless communication between the STB 102 and digital camera 104. Additionally, the channel 1 has directivity and is limited so that a communication feasible area may be restricted. The channel 2 has an arrangement which can wirelessly communicate in an area broader than that of channel 1.

In this embodiment, a power supply is supplied to the lighting apparatus 103, for example according to the power supply ON of the display 101 and the STB 102, or the power supply ON of the lighting apparatus 106. The lighting time of the lighting apparatus 103 may be limited to a predetermined amount of time (for example, for several minutes). The lighting apparatus 103 illuminates an area 105 in which the wireless communications with the digital camera 104 is possible. Then, if the power supply of the digital camera 104 is turned ON and put within the area 105, the wireless communication will become possible between the digital camera 104 and the lighting apparatus 103. The lighting apparatus 103 which checked that the wireless communication with the digital camera 104 had become possible provides notification that the digital camera 104 is in the area 105 for the STB 102.

Then, when a communication request with digital camera 104 occurs from the STB 102 via the second wireless communication unit, the communication request will be notified to the digital camera 104 via the lighting apparatus 103 from the STB 102. Then, when the wireless communication via the second wireless communication unit is established between the digital camera 104 and the STB 102, the image information stored by a storage unit, such as a memory card, is transmitted to the STB 102 from the digital camera 104 in accordance with a request of the STB 102.

The lighting apparatus 103 changes a state of the lighting in accordance with each communication state including a waiting state of a connection establishment of the wireless communication with the digital camera 104, a state in the connection establishment, a state under transfer of the image information from the digital camera 104 to the STB 102, and a state in which connection with the digital camera 104 is impossible. The state of the lighting includes changing a lighting color, flashing the light, changing a flashing cycle, changing a lighting brightness, and turning off the light, etc. Therefore, the user can recognize easily the connection state between the digital camera 104 and the STB 102 based on the state of the lighting, such as the state under transfer of the image information from the digital camera 104 to the STB 102, the state in the connection establishment between the digital camera 104 and the lighting apparatus 103, etc.

Additionally, the display 101 and the STB 102 may be integrated into a single unit, or the display 101, the STB 102, and the lighting apparatus 103 may integrated into the single unit.

After the wireless communications between the digital camera 104 and the STB 102 are established, even if the digital camera 104 is outside the area 105, the digital camera 104 may continue the wireless communications with the STB 102.

Figure 2:
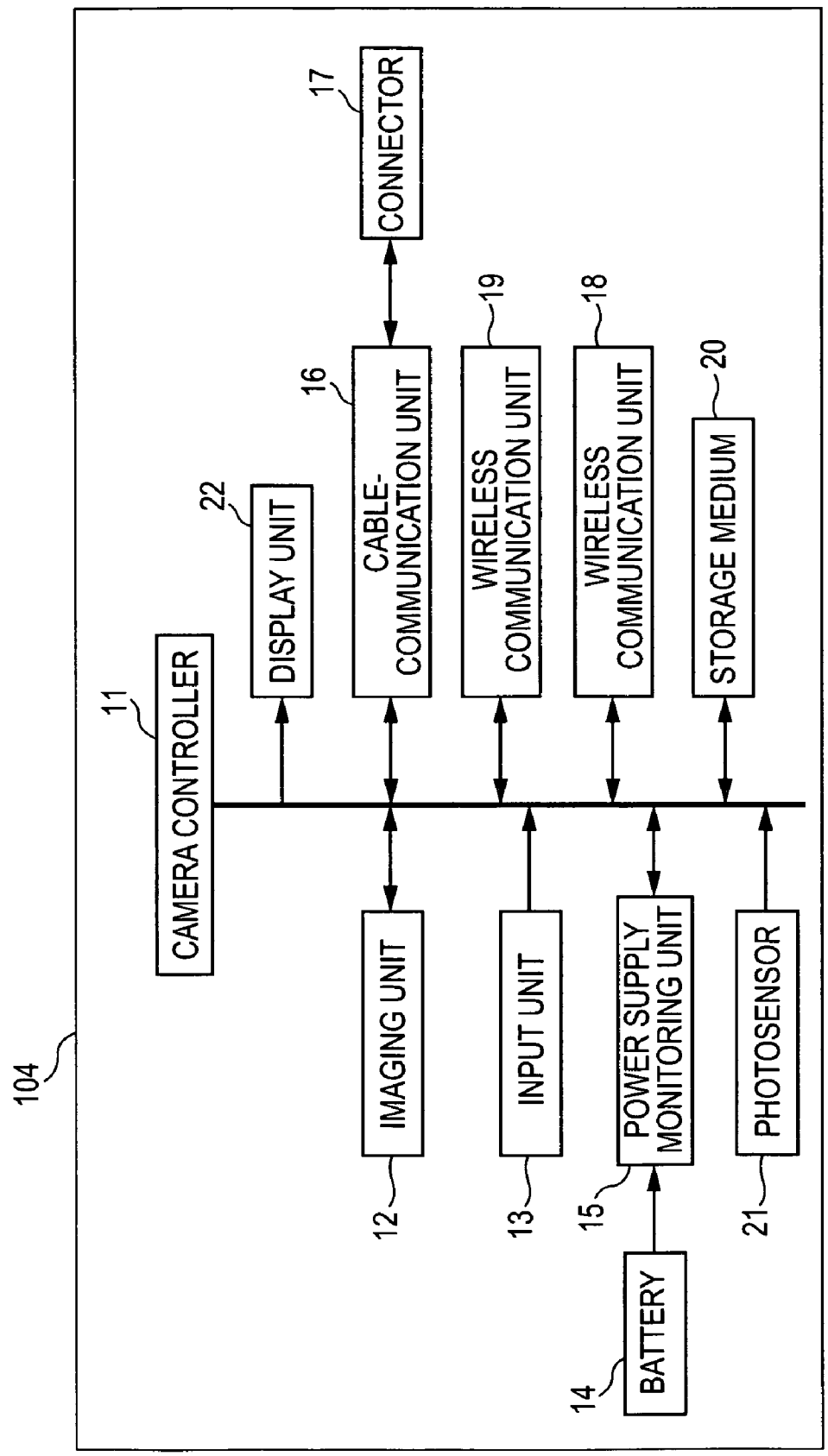
FIG. 2 is an exemplary block diagram of the digital camera in the first embodiment of the present invention.

FIG. 2 is an exemplary block diagram of the digital camera 104.

A camera controller 11 performs centralized control of operation of the digital camera 104. The camera controller 11 includes a CPU (central processing unit), a display unit 22, a ROM (read-only memory) which stores control programs executed by the CPU, a RAM (random access memory) which temporarily stores various data generated at the time of the control by the CPU, etc. The controlled operations by the camera controller 11 include an imaging operation in an imaging unit 12 according to an input operation of an input unit 13, a wireless communication operation which transmits the image data to the STB 102, the wireless communication operation with the lighting apparatus 103, and a monitoring operation of a power supply, etc.

The imaging unit 12 includes an image sensor (e.g., a CCD (charge coupled device)) and a buffer memory, etc. After the image data picked-up by the imaging unit 12 is stored in the buffer memory, it is stored by a storage media 20, such as the memory card, by control of the camera controller 11. Also, the image data can be transmitted outside of the digital camera 104 via a cable communication unit 16 or a wireless communication unit 19.

The input unit 13, including switches, buttons, etc. which are operated by the user, is used for performing an operation by a UI (user interface), operations of the power supply, a shutter and a camera zoom, etc. A battery 14 supplies the power to each circuit of the digital camera 104. The digital camera 104, via a connector 17, may supply the power outside and may receive the supply of the power from the outside. A power supply monitoring unit 15 measures a remaining amount of the battery 14 and notifies the measured remaining amount of the battery to the camera controller 11.

The cable communication unit 16 executes the role of the controller of the connector 17. The cable communication unit 16 also performs monitoring of a connection status of the connector 17, and notifies the monitored result to the camera controller 11. The connector 17 includes a plurality of connection terminals. The connector 17, among other terminals (e.g., PC (personal computer), a printer, etc.), transmits and receives a control signal and transmits the image data.

Wireless communication units 18 and 19 have a function with respect to the wireless communication. The wireless communication units 18 and 19 modulate a signal output from the camera controller 11 to an RF (radio frequency) signal, and then transmit the RF signal to other terminals. Also, the wireless communication units 18 and 19 demodulate the RF signal and transmit the demodulated signal to the camera controller 11. The wireless communication unit 18 performs the wireless communication (a first wireless communication unit) with the lighting apparatus 103, and the wireless communication unit 19 performs the wireless communication (a second wireless communication unit) with the STB 102. A photosensor 21 detects the light irradiated from the lighting apparatus 401.

Figure 3:
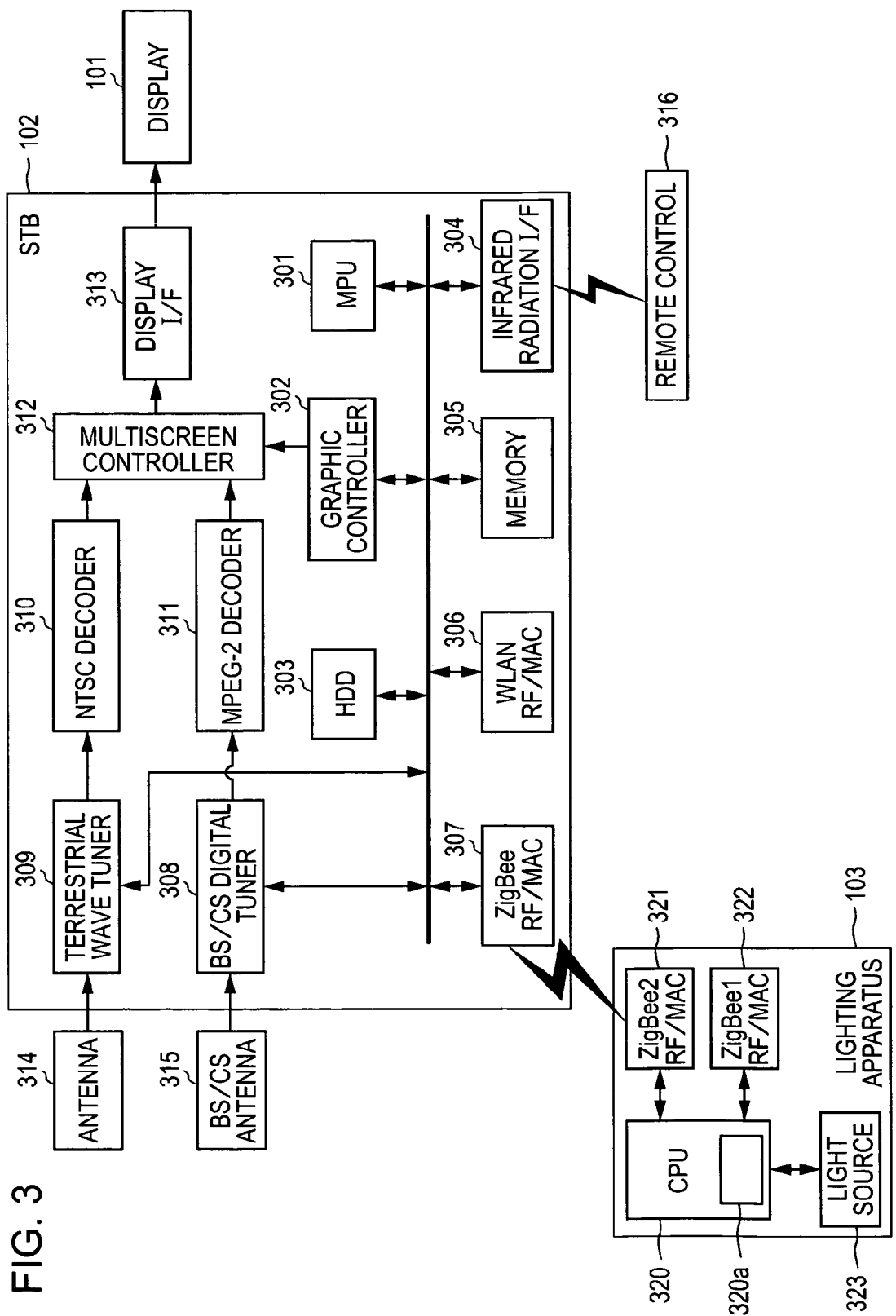
FIG. 3 is an exemplary block diagram of an STB (set top box) and a lighting apparatus in the first embodiment of the present invention.

FIG. 3 is an exemplary block diagram of the STB 102 and the lighting apparatus 103.

First, the arrangement of the STB 102 is explained. An MPU (micro processing unit) 301 controls the operation of the STB 102. A graphic controller 302 generates a character, a figure, etc. on which the image displayed on the display 101 is overlapped, and outputs them to a multiscreen controller 312. A hard disk drive (HDD) 303 stores the image data received from the digital camera 104 and the video signal of the television program, etc. An infrared radiation interface 304 receives an infrared signal from a remote control 316, and transmits a signal, which is generated according to the infrared signal, to the MPU 301. A memory 305 has a work area (RAM) which temporarily stores various data generated at the time of the control by the MPU 301, and an area (ROM) which stores programs executed by the MPU 301. A WLAN RF/MAC 306 includes the above-described second wireless communication unit, and controls the wireless communication of the WLAN (wireless local area network). A ZigBee RF/MAC 307 includes the above-described first wireless communication unit, and controls the wireless communication of the ZigBee. A BS/CS digital tuner 308 extracts a desired TV program signal from the signal received with a BS/CS antenna 315. The TV program signal is descrambled and decoded by an MPEG-2 (moving picture expert group) decoder 311 and is converted into the video signal. The video signal converted by the MPEG decoder 311 is transmitted to the multiscreen controller 312. Additionally, a terrestrial wave tuner 309 extracts a desired TV program signal from the signal received with an antenna 314. The TV program signal is decoded by a NTSC (National Television System Committee) decoder 310 and is converted into the video signal. The video signal converted by the NTSC decoder 310 is transmitted to the multiscreen controller 312. The multiscreen controller 312 outputs the above-described video signals to a display interface 313, and displays them on the display 101.

Next, the arrangement of the lighting apparatus 103 is described.

A CPU 320 controls operations of the lighting apparatus 103 according to a program stored in a memory 320*a*. A light source 323, by control of the CPU 320, can change a lighting color and can flash the lighting. ZigBee RF/MAC 321 and 322 include the above-described first wireless communication unit and control the wireless communication of the ZigBee. One side of these is used for communication with the STB 102, and another side is used for communication with the digital camera 104.

Next, the operation of each apparatus is explained.

Figure 4:
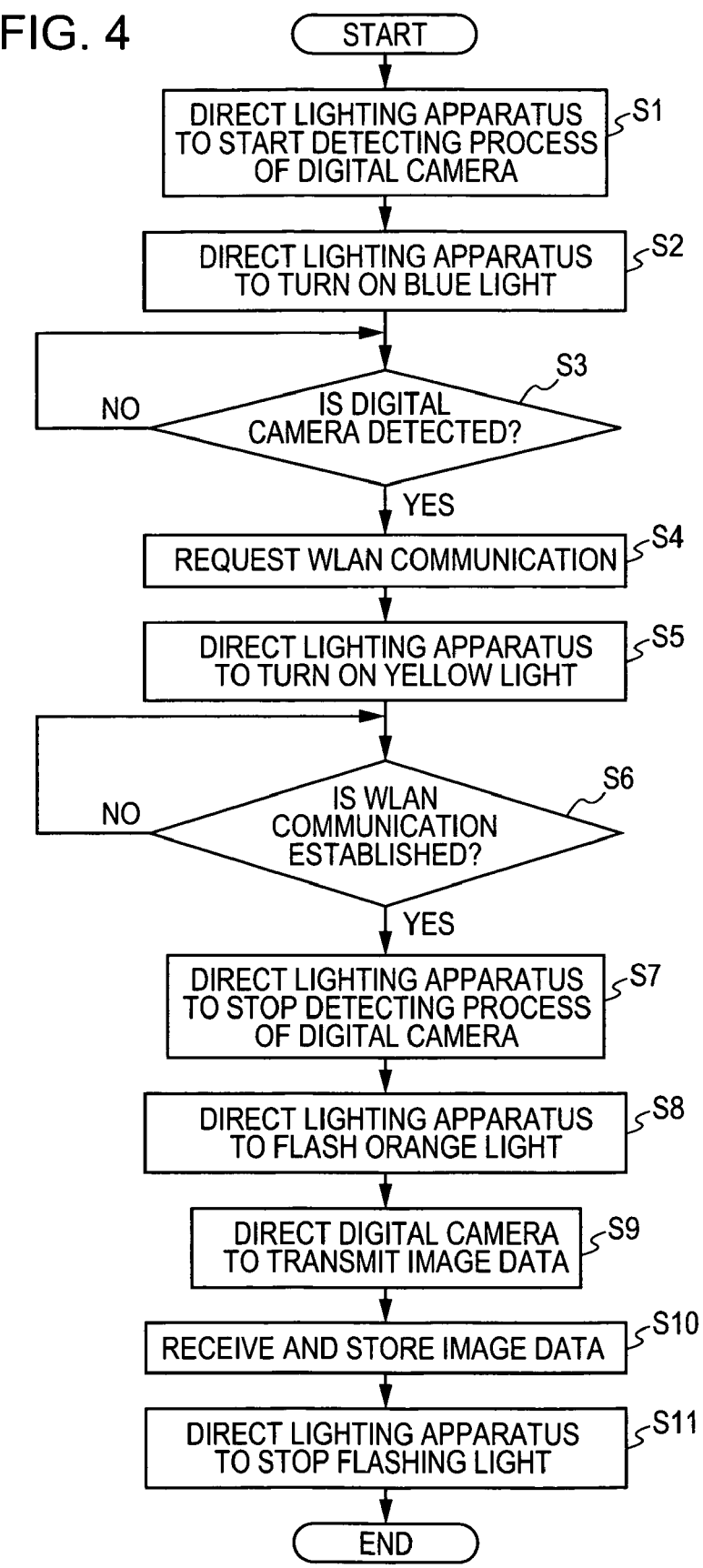
FIG. 4 is a flowchart illustrating exemplary operation procedures of the STB in the first embodiment of the present invention.

FIG. 4 is a flowchart illustrating exemplary operation procedures of the STB 102 in one embodiment of the present invention. The program which performs the operation procedures is stored in the memory 305, and is executed under control of the MPU 301.

This flowchart is started by turning on the power supply of the STB 102. First, in step S1, the start of the camera detecting process which detects whether the digital camera 104 is in the area 105 is directed for the lighting apparatus 103. Next, in step S2, the STB 102 directs the lighting apparatus 103 to turn on a blue light. In step S3, it is determined whether the digital camera 104 is detected by the lighting apparatus 103. If the digital camera 104 is not detected by the lighting apparatus 103 (no in step S3), this processing is repeated. Therefore, while performing a detecting process for detecting a camera 104, the lighting apparatus 103 has turned on the blue light. The user can recognize easily that the process for detecting whether the digital camera 104 is in the area 105 is performed, while the lighting apparatus 103 has tuned on the blue light.

If the digital camera 104 is detected by the lighting apparatus 103 (yes in step S3), the processing proceeds to step S4. In step S4, the STB 102 notifies the establishment request of communication with the digital camera by the second wireless communication unit (WLAN) to the lighting apparatus 103. Next, in step S5, the STB 102 directs the lighting apparatus 103 to turn on a yellow light.

Thus, for the digital camera 104, the direction for performing the communication with the STB 102 by using the second wireless communication unit is transmitted from the lighting apparatus 103. In step S6, it is determined whether the wireless communication with the digital camera 104 by using the second wireless communication unit (WLAN) is established. If the wireless communication is not established (no in step S6), this processing is repeated. If the wireless communication is established (yes in step S6), the processing proceeds to step S7. In step S7, the STB 102 directs the lighting apparatus 103 to stop the detecting process for detecting a camera 104. The reason for stopping the detecting process is because the digital camera 104 does not necessarily need to be in the area 105, after the communication with the digital camera 104 by the WLAN is started. Next, in step S8, the STB 102 directs the lighting apparatus 103 to flash an orange light. Flashing an orange light allows the user to easily recognize that the wireless communication is established between the STB 102 and the digital camera 104.

Next, in step S9, the STB 102, via the WLAN, directs the digital camera 104 to transmit the image data. In step S10, the STB 102 receives the image data which is sent from the digital camera 104 and stores the received image data in the HDD 303. If needed, the image data may be transmitted to the display 101, and may be displayed on the display 101. In step S11, the STB 102 directs the lighting apparatus 103 to stop the flashing light.

Thus, the establishment of the wireless communications between the STB 102 and the digital camera 104 via the lighting apparatus 103, and the lighting control of the lighting apparatus 103 can be performed. Furthermore, the STB 102 can receive the image data from the digital camera 104 automatically by different wireless communication (WLAN) from the wireless communication (ZigBee) with the lighting apparatus.

Additionally, since wireless communication connection between the apparatuses and the transfer status of the image data can identify the lighting color and lighting action (e.g., flashing, etc.) of the lighting apparatus 103, this system is very user-friendly.

Next, the operation of the lighting apparatus 103 is described.

Figure 5:
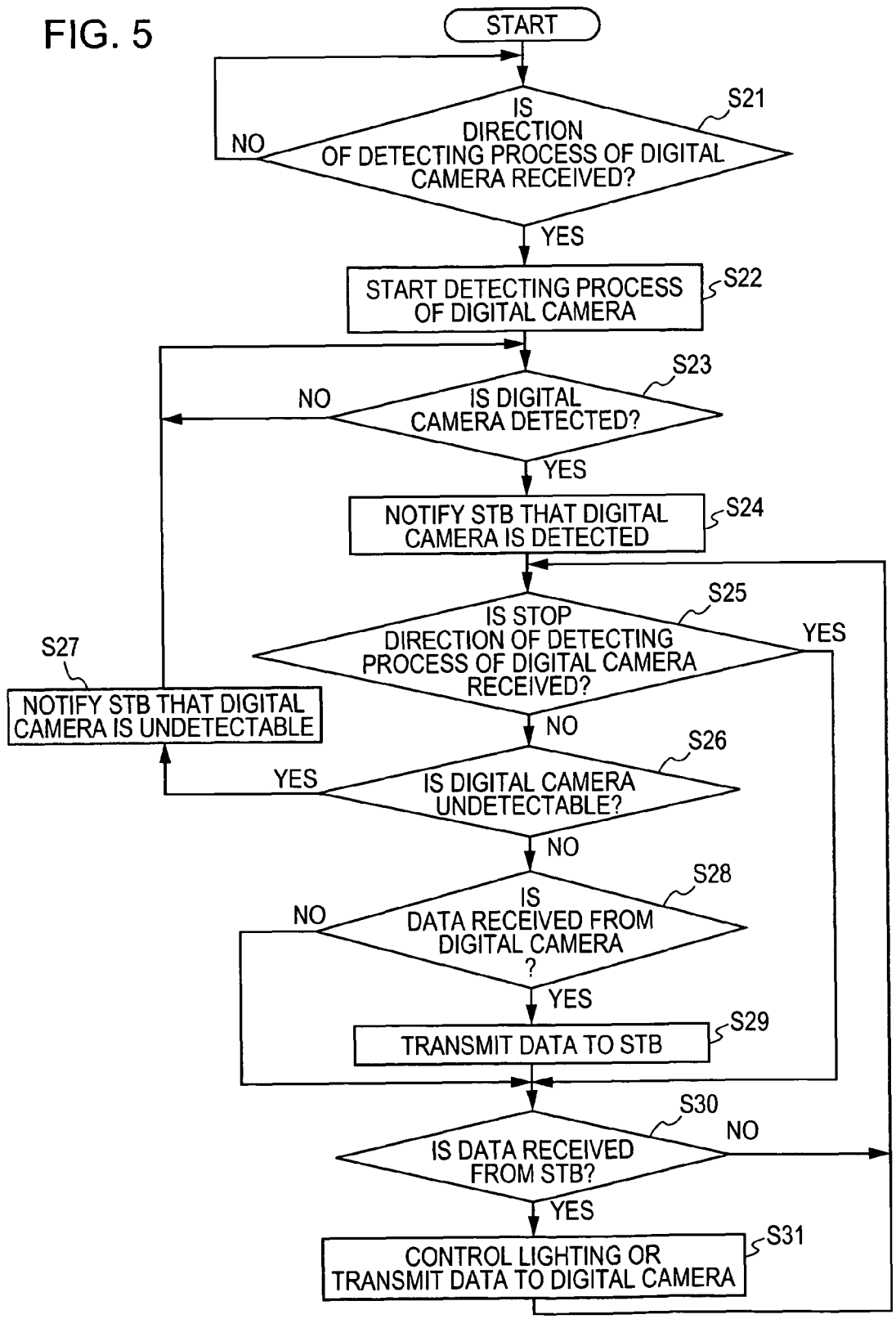
FIG. 5 is a flowchart illustrating exemplary operation procedures of the lighting apparatus in the first embodiment of the present invention.

FIG. 5 is a flowchart illustrating exemplary operation procedures of the lighting apparatus 103 in one embodiment of the present invention. The program which performs the operation procedures is stored in the memory 320a of the CPU 320, and is executed under control of the CPU 320.

First, in step S21, it is determined whether the direction of the detecting process for detecting a camera 104 from the STB 102 is received. If the direction is not received (no in step S21), this processing is repeated. If the direction is received (yes in step S21), the processing proceeds to step S22. In step S22, the detecting process for detecting a camera is started. Next, in step S23, it is determined whether the digital camera 104, which is placed in the area 105, is detected. The detecting determination of the digital camera is based on whether the wireless communication becomes possible between the lighting apparatus 103 and the digital camera 104. If the digital camera 104 is not detected (no in step S23), this processing is repeated. If the digital camera 104 is detected (yes in step S23), the processing proceeds to step S24. In step S24, it is notified to the STB 102 that the digital camera 104 is detected. Then, in step S25, it is determined whether a stop direction of the detecting process for detecting a camera 104 is received from the STB 102. If the stop direction is not received (no in step S25), the processing proceeds to step S26. In step S26, it is determined whether the digital camera 104 is undetectable. If the digital camera 104 is undetectable (yes in step S26), the processing proceeds to step S27. In step S27, it is notified to the STB 102 that the digital camera 104 is undetectable, and then, the processing returns to step S23. If the stop direction is received (yes in step S25), the detecting process for detecting a camera 104 is not stopped, and the processing proceeds to step S30.

In step S26, if the digital camera 104 is detectable (no in step S26), the processing proceeds to step S28. In step S28, it is determined whether data is received from the digital camera 104. If data is not received from the digital camera 104 (no in step S28), the processing proceeds to step S30. If data is received from the digital camera 104 (yes in step S28), the processing proceeds to step S29. In step S29, the received data is transmitted to the STB 102. The processing is performed in order to perform a data exchange between the digital camera 104 and the STB 102 in a state where the direct wireless communication between the digital camera 104 and the STB 102 is not established. Next, in step S30, it is determined whether data is received from the STB 102. If data in not received from the STB 102 (no in step S30), the processing returns to step S25. If data is received from the STB 102 (yes in step S30), the processing proceeds to step S31. In step S31, the lighting control (e.g., changing the lighting color, flashing the light, turning off the light, etc.) or the data transmission to the digital camera 104 (e.g., request of the wireless communication by the WLAN) is performed according to the data received from the STB 102. Then, the processing returns to step S25.

Thus, the lighting apparatus 103 can inform the communication status to the user by changing the lighting color or the lighting action according to the direction from the STB 102.

Next, the operation of the digital camera 104 is described.

Figure 6:
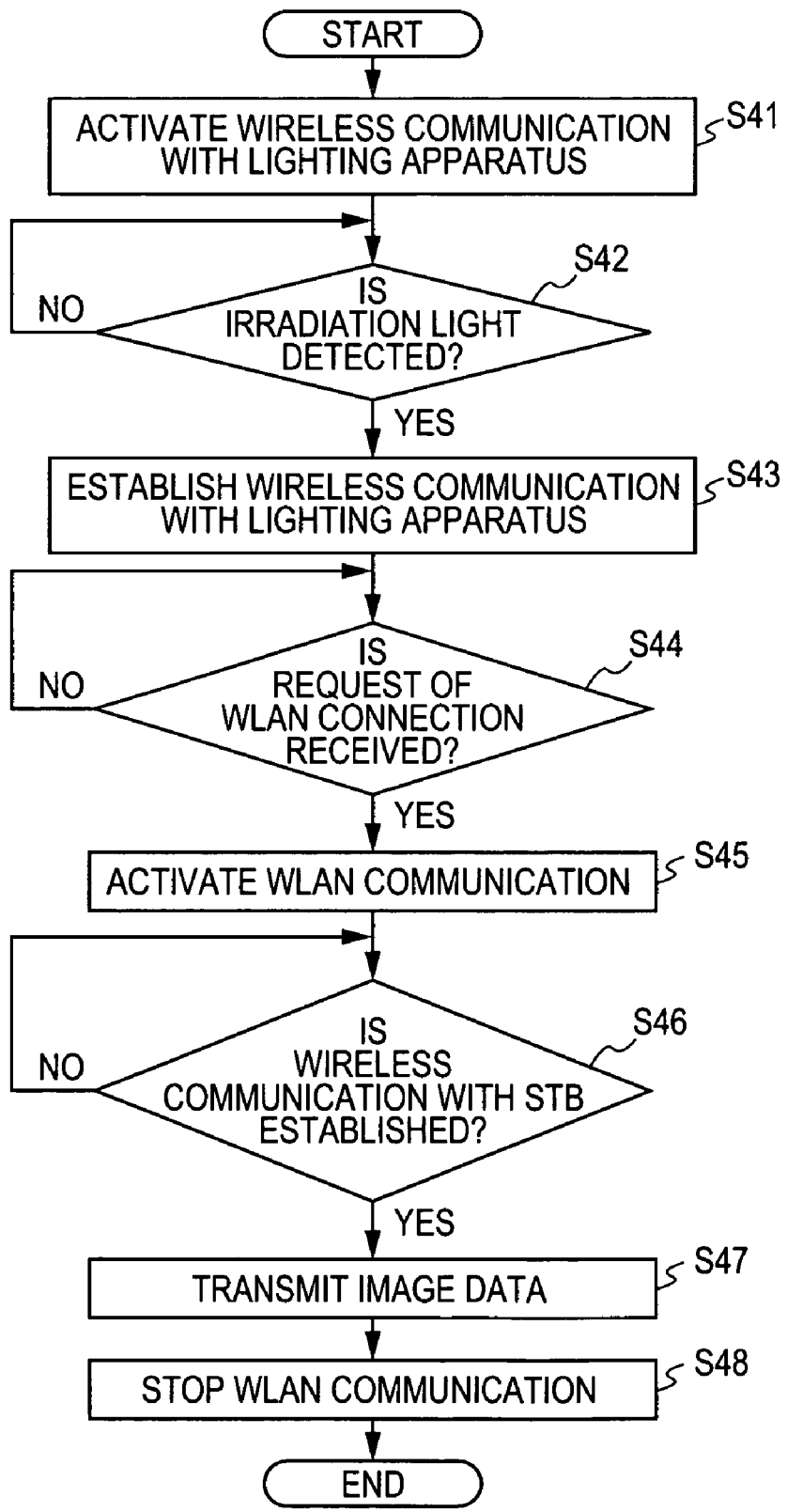
FIG. 6 is a flowchart illustrating exemplary operation procedures of the digital camera in one embodiment of the present invention.

FIG. 6 is a flowchart illustrating exemplary operation procedures of the digital camera 104 in one embodiment of the present invention. The program which performs the operation procedures is stored in the camera controller 11, and is executed under control of a CPU (not shown) in the camera controller 11.

First, in step S41, in order to perform the wireless communication with the lighting apparatus 103, the wireless communication unit 18 is activated. Next, in step S42, by using the photosensor 21, the irradiation light from the lighting apparatus 104 is detected (that is, it is determined whether the digital camera 104 is put on the area 105). In cases where the digital camera 104 is put on the area 105, the wireless communication between the lighting apparatus 103 and the digital camera 104 becomes possible. If the irradiation light is not detected (no in step S42), this processing is repeated. If the irradiation light is detected (yes in step S42), the processing proceeds to step S43. In step S43, the wireless communication with the lighting apparatus 103 is established. Then, in step S44, it is determined whether the request of the WLAN connection is received. If the request is not received (no in step S44), this processing is repeated. If the request is received (yes in step S44), the processing proceeds to step S45. In step S45, the wireless communication with the STB 102 by the WLAN is activated. Next, in step S46, it is determined whether the wireless communication with the STB 102 is established. If the wireless communication with the STB 102 is not established (no in step S46), this processing is repeated. If the wireless communication with the STB 102 is established (yes in step S46), the processing proceeds to step S47. In step S47, according to a request of the STB 102, the image data stored on the storage medium 20 is read, and transmitted to the STB 102. When the transmission of the image data in step S47 is completed, the processing proceeds to step S48, and the wireless communication by the WLAN is stopped.

While executing the connection establishment with the lighting apparatus 103, a message "establishing connection" may be displayed on the display unit 22. Additionally, while performing the data transmission, a message "transmitting data" may be displayed on the display unit 22.

At this time, by bringing the color or the flashing cycle of the light of the lighting apparatus 103 into sync with the display of the display unit 22, it may be made to specify clearly to the user that the operation of the digital camera 104 is interlocked with the lighting apparatus 103. Also, the light color of the lighting apparatus 103 may be changed from the digital camera 104 and the flashing of the lighting apparatus 103 may be performed from the digital camera 104. For example, in step S44 of FIG. 6, when the digital camera 104 receives the request of the WLAN connection, in cases where there is little remaining capacity of the battery 14, it may be determined that the connection by the WLAN is impossible. Then, if it is determined that the connection is impossible, the digital camera 104 directs the lighting apparatus 103 to flash red light. Thus, the above-described processing can be used to inform the user of an error.

Since it is difficult to give directivity to a radio antenna, the ZigBee of the first wireless communication unit may be replaced with IrDA (Infrared Data Association) (e.g., IrBUS). The directivity of the IrBUS is high in order to use the infrared radiation. Since communication ranges are 6 to 8 m, even if it attaches to the ceiling of living room etc., they can cover the distance to a floor. Handshaking of the wireless communication in this case etc. is made like the above-described embodiment.

Although all the image data stored on the storage medium 20 of the digital camera 104 is transmitted to the STB 102 and displayed on the display 101 in the above-described embodiment, this invention is not limited to it. For example, the index (attribute information, such as a file name and a photographing date) of the image stored on the storage medium 20 is transmitted from the digital camera 104, and it displays on the display 101. Then, the image data which the user wants to display is selected by using the remote control 316, and only the selected image data is requested of the digital camera 104. The selected image data is transmitted to the STB 102 from the digital camera 104 and may be displayed.

In this embodiment, according to the camera detection direction from the STB 102, the lighting apparatus 103 starts detection of the digital camera 104. Additionally, the STB 102 requests the wireless communication between the digital camera 104 and the STB 102, of the digital camera via the lighting apparatus 103 and then the wireless communication is performed, but this embodiment is not limited to it. For example, the lighting apparatus 103 may always be made to detect the digital camera 104. Also, the wireless communication between the digital camera 104 and the STB 102 may be performed based on the image transfer request from either, after the wireless connection is mutually detected.

Thus, according to this embodiment, the image data stored by digital camera 104 can be automatically transmitted to the STB 102 by putting the digital camera 104 on the area 105 in which the wireless communication with the lighting apparatus 103 are possible. Then, the transmitted image can be displayed on the display panel 101.

Since the transmitting status of the image data between the digital camera 104 and the STB 102, establishment of the wireless communication, etc. are clearly specified by the lighting of the lighting apparatus 103, the user can easily determine the state of each apparatus.

Second Embodiment

In the first embodiment, if the digital camera 104 advanced into the area 105, the image data stored on storage medium 20 of the digital camera 104 is transmitted to the STB 102, and the STB 102 receives the image data and stores it in the HDD 303. Then, although it may be made to display on the display 101 if needed, it needs to be operated that a user sets up the processing method of the transmitted image data for the STB 102 or the display 101 beforehand. In the second embodiment, a system by which the user can specify the processing method of the transmitted image data simply is provided.

Figure 7:
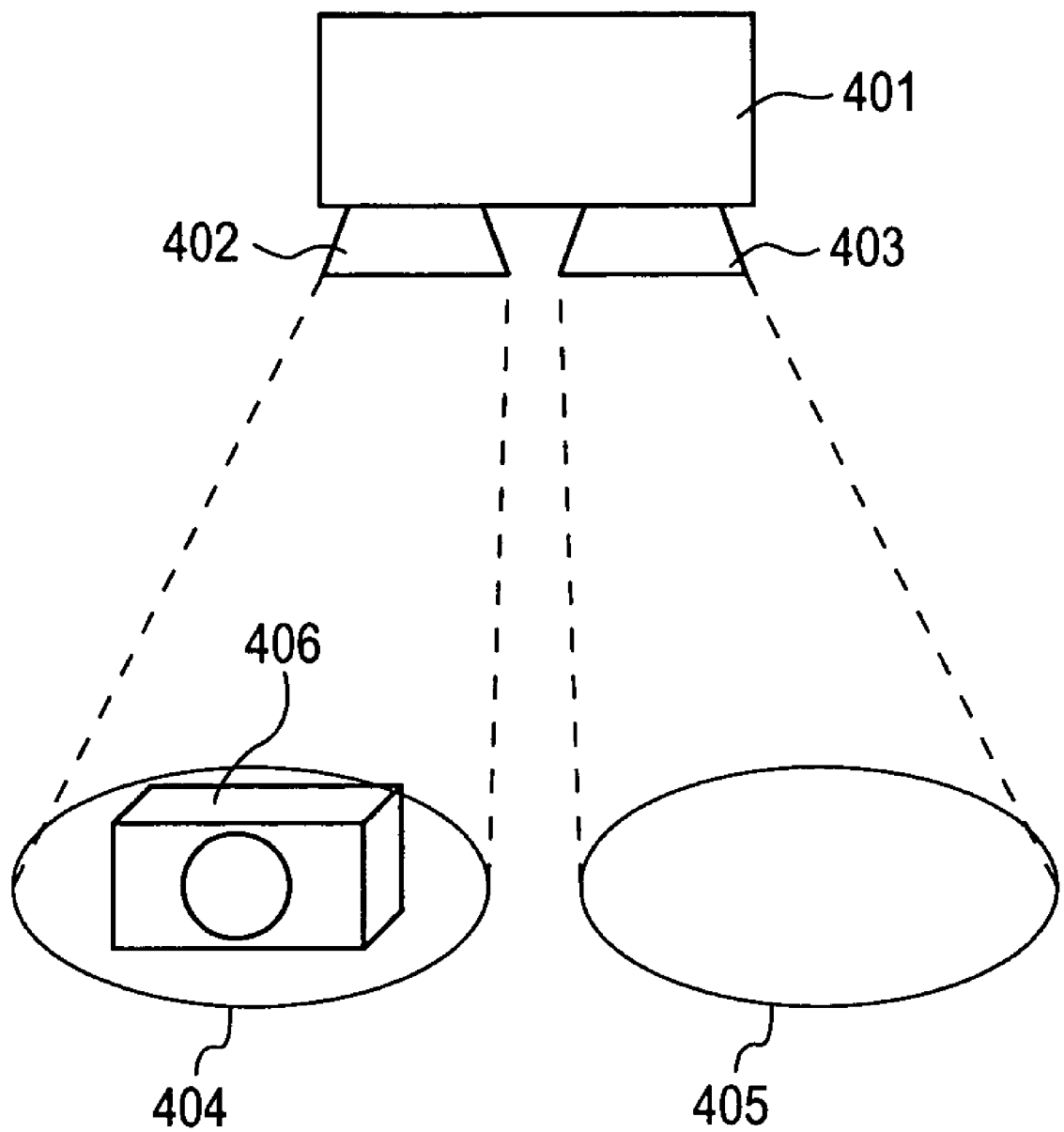
FIG. 7 illustrates an exemplary arrangement of the lighting apparatus and the digital camera in a second embodiment of the present invention.

FIG. 7 illustrates an exemplary arrangement of the lighting apparatus and the digital camera in the second embodiment of the present invention.

FIG. 7 includes a lighting apparatus 401 and a digital camera 406. The lighting apparatus 401 is illuminating the area in which wireless communications with the digital camera 406 are possible like the lighting apparatus 103 of the first embodiment. The lighting apparatus 401 of the second embodiment is equipped with two light sources 402 and 403 with irradiation areas 404 and 404, respectively.

The lighting apparatus 401 can be equipped with the wireless communication unit (ZigBee), and can perform the wireless communications with the digital camera 406 and the STB 102. As in the first embodiment, the channel used for communication of the digital camera 406 is different from the channel used for communication of the STB 102. The channel used for the wireless communication with the digital camera 406 is configured so that a communication area may be limited to a part of the room. Both the lighting area 404 and the lighting area 405 are areas in which wireless communication with the digital camera 406 or the STB 102 is possible.

In the connection establishment waiting state of the wireless communication with the digital camera 406, the lighting apparatus is controlled to turn on the light source 402 and 403 using a mutually different lighting color.

Figure 8:
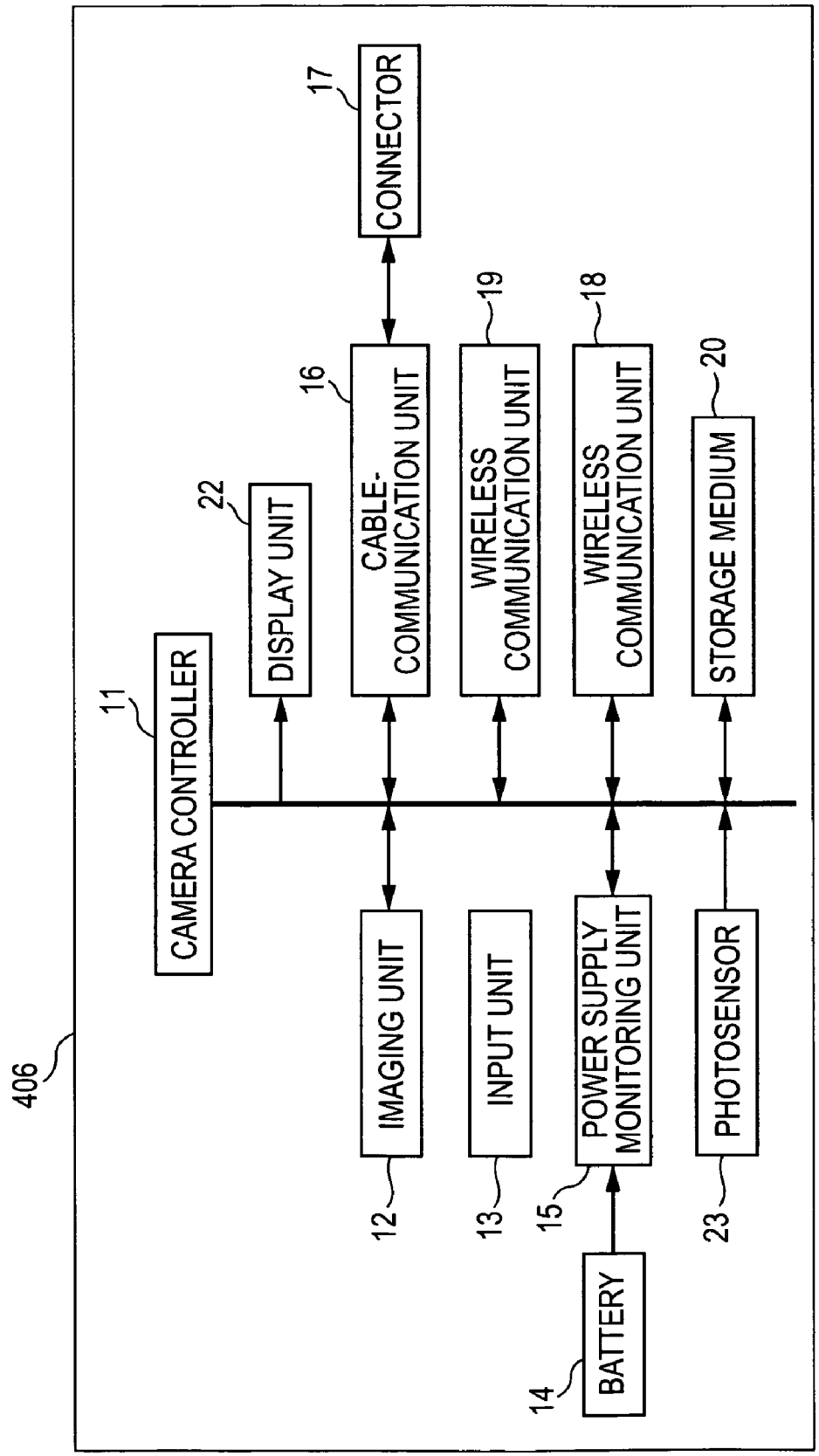
FIG. 8 is a block diagram of the digital camera in the second embodiment of the present invention.

FIG. 8 is an exemplary block diagram of the digital camera in the second embodiment of the present invention. Components of the second embodiment (shown in FIG. 8) that have the same function as components of the first embodiment (shown in FIG. 2 and described above) have the same reference number and descriptions thereof are not repeated here.

The upper part of the case of the digital camera 406 is equipped with a photosensor 23, and it detects the light irradiated from the lighting apparatus 401. The photosensor 23 recognizes the irradiated lighting color (light source color).

Figure 9:
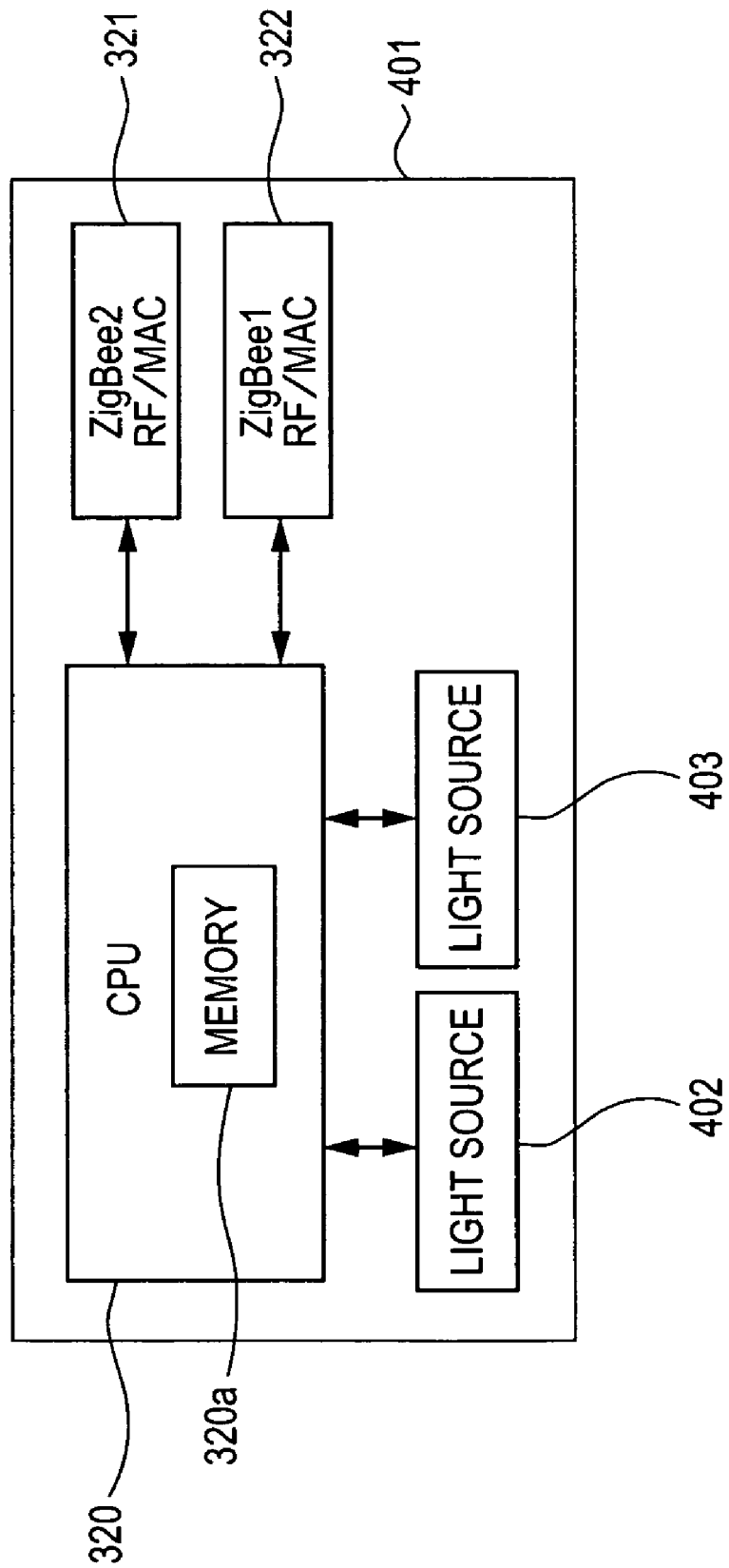
FIG. 9 is a block diagram of the lighting apparatus in the second embodiment of the present invention.

FIG. 9 is an exemplary block diagram of the lighting apparatus in the second embodiment of the present invention. Components of the second embodiment (shown in FIG. 9) that have the same function as components of the first embodiment (shown in FIG. 3 and described above) have the same reference number and descriptions thereof are not repeated here.

As described above, the lighting apparatus 401 is equipped with the light sources 402 and 403, and these light sources 402 and 403, by the control of the CPU 320, can emit light by a mutually different color, respectively, and can perform mutually different flashing light.

The arrangement of the STB 102 of the second embodiment is the same as the arrangement of the STB 102 of the first embodiment (shown in FIG. 3 and described above). Descriptions thereof are not repeated here.

Next, the operation of each apparatus is explained.

Figure 10:
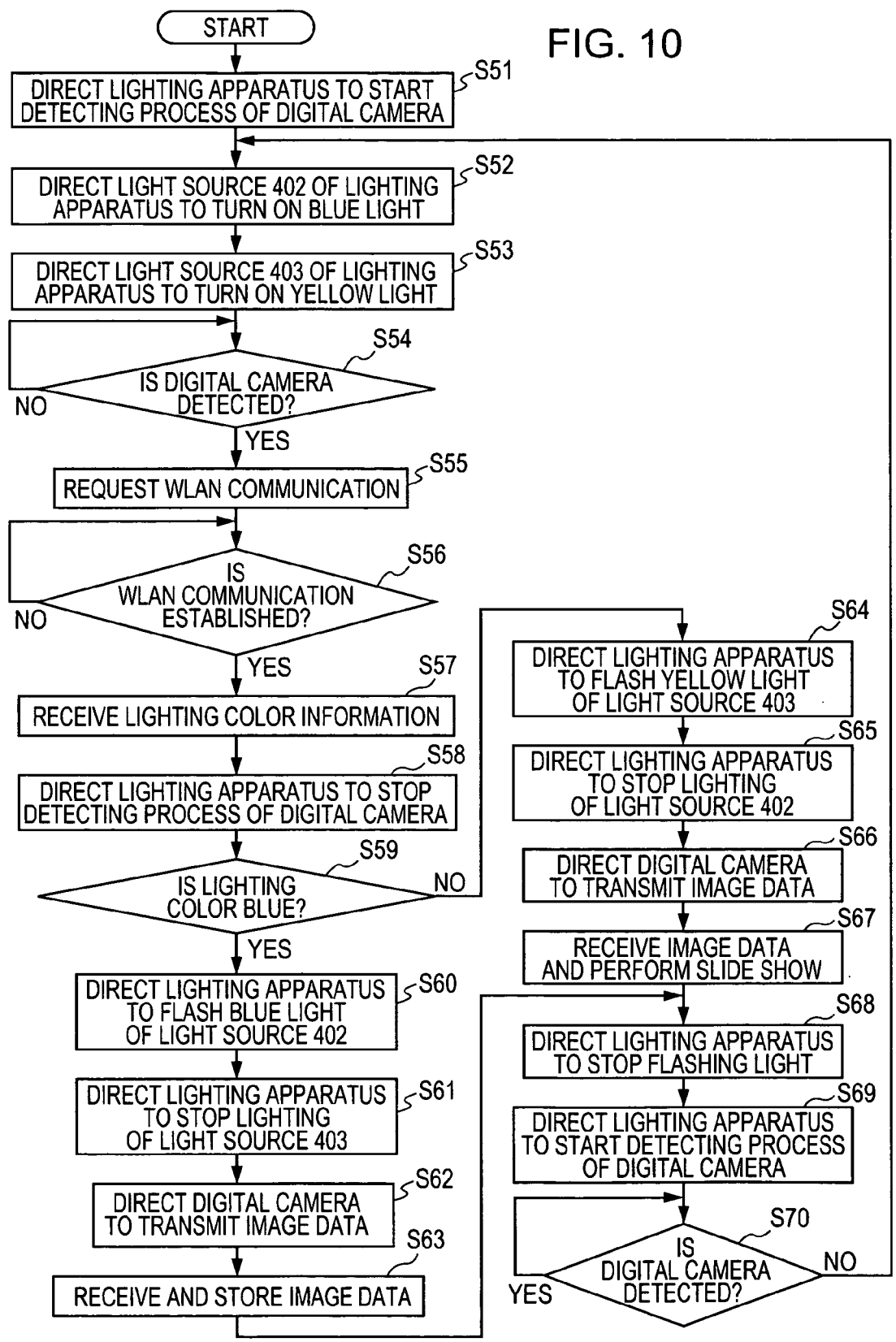
FIG. 10 is a flowchart illustrating exemplary operation procedures of the STB in the second embodiment of the present invention.

FIG. 10 is a flowchart illustrating exemplary operation procedures of the STB 102 in the second embodiment of the present invention. The program which performs the operation procedures is stored in the memory 305, and is executed under control of the MPU 301.

This flowchart is started by turning on the power supply of the STB 102. First, in step S51, the start of the camera detecting process which detects whether the digital camera 104 is within the area 404 or 405 is directed for the lighting apparatus 103. Next, in step S52, the STB 102 directs the light source 402 of the lighting apparatus 401 to turn on a blue light. Next, in step S53, the STB 102 directs the light source 403 of the lighting apparatus 401 to turn on a yellow light. In step S54, it is determined whether the digital camera 104 is detected by the lighting apparatus 103. If the digital camera 104 is not detected by the lighting apparatus 103 (no in step S54), this processing is repeated.

In the second embodiment, if the user puts the digital camera 406 on the irradiation area 404 of the blue, the image data received from the digital camera 406 is stored in the HDD 303. On the other hand, if the user puts the digital camera 406 on the irradiation area 405 of the yellow, the image data received from the digital camera 406 is displayed on the display 101 as a slide show. Thus, the processing method of the image data received from the digital camera 406 can be specified by on which of irradiation areas (404, 405) the digital camera 406 is put.

Thus, for example, when a television program is under watching and listening on the display 101, only the light source 402 is turned on the blue light. Thus, the user is only notified about a storage operation of the image data being possible and as the ability to display the image data on the display 101 is not currently available.

If the digital camera 406 is detected by the lighting apparatus 103 (yes in step S54), the processing proceeds to step S55. In step S55, the STB 102 notifies the establishment request of communication with the digital camera by the second wireless communication unit (WLAN) to the lighting apparatus 103.

In the second embodiment, the digital camera 406 recognizes the lighting color with the photosensor 23, and transmits the recognized color information to the STB 102 via the lighting apparatus 401. Thus, the STB 102 determines the processing method of image data based on the received color information. The user is able to set up correspondence of the lighting color and the application activated for the STB 102 beforehand.

In step S56, it is determined whether the wireless communication with the digital camera 104 by using the second wireless communication unit (WLAN) is established. If the communication is not established (no in step S56), this processing is repeated. If the communication is established (yes in step S56), the processing proceeds to step S57. In step S57, the color information recognized by the digital camera 406 is received via the lighting apparatus 401. Next, in step S58, the STB 102 directs the lighting apparatus 401 to stop the detecting process for detecting a camera 406. Next, in step S59, it is determined whether the lighting color is the blue based on the received color information. If the lighting color is blue (yes in step S59), the processing proceeds to step S60. In step S60, the STB 102 directs the lighting apparatus 401 to flash the blue light of the light source 402. Thus, the user can recognize that the wireless communication by the WLAN is established between the digital camera 406 and the STB 102. Additionally, the user can recognize that the processing which stores the image data to the HDD 303 has been prepared. In step S61, in order to show that the slide show cannot be performed at this time, the STB 102 directs the lighting apparatus 401 to stop the lighting of the light source 403 (yellow). Next, in step S62, the STB 102, via the WLAN, directs the digital camera 406 to transmit the image data. Then, in step S63, the STB 102 receives the image data which is sent from the digital camera 406 and stores the received image data in the HDD 303.

On the other hand, in step S59, if the lighting color is not blue (no in step S59), the processing proceeds to step S64. In step S64, the STB 102 directs the lighting apparatus 401 to flash the yellow light of the light source 403. Thus, the user can recognize that the wireless communication by the WLAN is established between the digital camera 406 and the STB 102. Additionally, the user can recognize that the slide show of the image data has been prepared. In step S65, in order to show that the image data is not stored in the HDD 303 at this time, the STB 102 directs the lighting apparatus 401 to stop the lighting of the light source 402 (blue). Next, in step S66, the STB 102, via the WLAN, directs the digital camera 406 to transmit the image data. Then, in step S67, the STB 102 receives the image data which is sent from the digital camera 406 and performs the slide show of the received image data by using the display 101. In step S68, the STB 102 directs the lighting apparatus 401 to stop the flashing light of the light source. Then, in step S69, the start of the camera detecting process which detects whether the digital camera 406 is in the area, in which wireless communication is possible, is directed for the lighting apparatus 401. That is, the detecting process which detects whether the digital camera 406 was moved outside the area is started. However, the light source 402 and the light source 403 have stopped lighting at this time. Next, in step S70, it is determined whether the digital camera 406 is detected by the lighting apparatus 401. If the digital camera 406 is detected (yes in step S70) (that is, if the digital camera 406 is still in the area), this processing is repeated. That is, the STB 102 waits until the digital camera 406 is moved out of the area in which the wireless communication is possible. If the digital camera is not detected (no in step S70) (that is, if the digital camera was moved out of the area), the STB 102 receives a moving event of the digital camera 406 from the lighting apparatus 401 and the processing returns to step S52.

As described above, it does not shift to the next processing until the digital camera 406 is moved outside the area in which the wireless communication is possible. This is for preventing repeating the send action of image data, in cases where the digital camera 406 continues being put on the area in which the wireless communication is possible.

Thus, the processing method of the image data in the STB 102 after transmitting image data to the STB 102 from digital camera 406 can be easily changed in accordance with the irradiation area on which the digital camera 406 is put. Therefore, special operations (e.g., a menu setup, operations of a button with which the digital camera is equipped, etc.) become unnecessary when the user sets the digital camera 406 in the irradiation area. Since the processing operation is discriminable according to a lighting color, it is user-friendly.

For example, in cases where the digital camera 406 is put on the blue irradiation area, only non-transmitted image data may be transmitted to the STB 102, and in cases where the digital camera 406 is put on the yellow irradiation area, all the image data may be transmitted to the STB 102. Additionally, for example, in cases where the digital camera 406 is put on the blue irradiation area, all the image data may be automatically transmitted to the STB 102, and in cases where the digital camera 406 is put on the yellow irradiation area, only the image data which the user selected may be transmitted to the STB 102. Thus, it is also possible to change the procedure of image supply according to the lighting color.

Next, the operation of the lighting apparatus 401 is explained.

Figure 11:
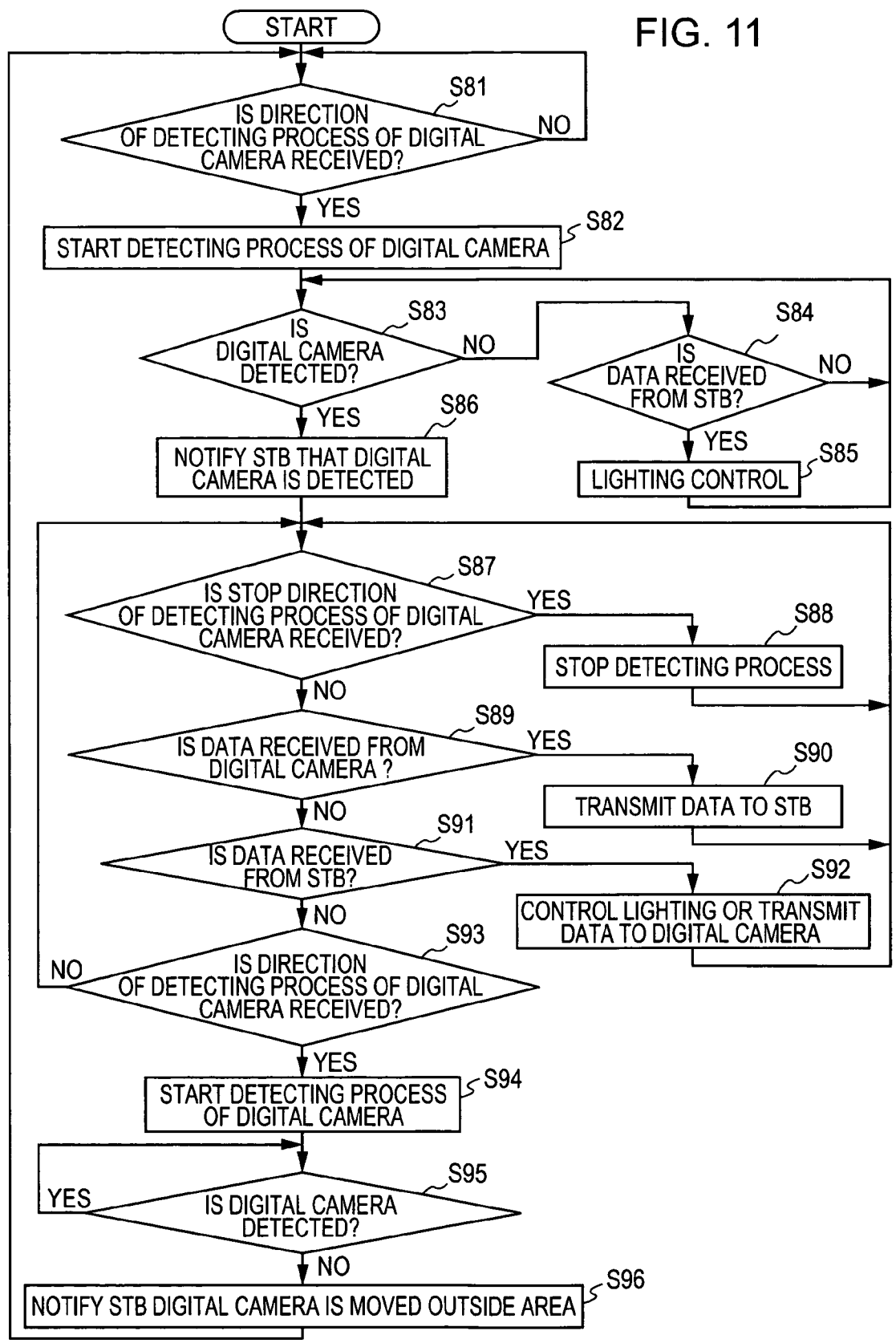
FIG. 11 is a flowchart illustrating exemplary operation procedures of the lighting apparatus in the second embodiment of the present invention.

FIG. 11 is a flowchart illustrating exemplary operation procedures of the lighting apparatus 401 in the second embodiment of the present invention. The program which performs the operation procedures is stored in the memory 320*a* of the CPU 320, and is executed under control of the CPU 320.

First, in step S81, it is determined whether the direction of the detecting process for detecting a camera 406 from the STB 102 is received. If the direction is not received (no in step S81), this processing is repeated. If the direction is received (yes in step S81), the processing proceeds to step S82. In step S82, the detecting process for detecting a camera is started. Next, in step S83, it is determined whether the digital camera 406, which is placed in the area in which the wireless communication is possible, is detected. The detecting determination of the digital camera is based on whether the wireless communication becomes possible between the lighting apparatus 401 and the digital camera 406. If the digital camera 406 is detected (yes in step S83), the processing proceeds to step S86. In step S86, it is notified to the STB 102 that the digital camera is detected. On the other hand, if the digital camera 406 is not detected (no in step S83), the processing proceeds to step S84. In step S84, it is determined whether data is received from the STB 102. If data is not received from the STB 102 (no in step S84), the processing returns to step S83. If data is received from the STB 102 (yes in step S84), the processing proceeds to step S85. In step S85, lighting control (e.g., changing the lighting color, turning on the light, flashing the light, changing the luminance, turning off the light, etc.) is performed according to the data received from the STB 102. The processing returns to step S83 after step S85.

In step S87, it is determined whether a stop direction of the detecting process for detecting a camera 406 is received from the STB 102. If the stop direction is received (yes in step S87), the processing proceeds to step S88, and the detecting process for detecting a camera 406 is stopped. The processing returns to step S87. If the stop direction is not received (no in step S87), the processing proceeds to step S89.

In step S89, it is determined whether data is received from the digital camera 406. If data is received from the digital camera 406 (yes in step S89), the processing proceeds to step S90. In step S90, the received data is transmitted to the STB 102. Thus, the digital camera 406 recognizes the irradiated lighting color, and the recognized color information is transmitted to the STB 102 via the lighting apparatus 401. Processing then returns to step S87. If data is not received from the digital camera 406 (no in step S89), the processing proceeds to step S91.

In step S91, it is determined whether data is received from the STB 102. If data is received from the STB 102 (yes in step S91), the processing proceeds to step S92. In step S92, the lighting control (e.g., changing the lighting color, flashing the light, turning off the light, etc.) or the data transmission to the digital camera 406 (e.g., request of the wireless communication by the WLAN) is performed according to the data received from the STB 102. Processing then returns to step S87. If data is not received from the STB 102 (no in step S91), the processing proceeds to step S93.

In step S93, it is determined whether the start direction of the detecting process for detecting a camera 406 from the STB 102 is received. The start direction of the detecting process for detecting a camera is published, after the STB 102 receives the image data from digital camera 406, and stores it in the HDD 303 or performs the slide show. After the receiving operation of image data is completed in the STB 102, this is performed in order to determine whether the digital camera 406 was once moved outside wireless communication feasible (possible) area.

If the start direction is not received (no in step S93), the processing returns to step S87. If the start direction is received (yes in step S93), the processing proceeds to step S94. In step S94, the detecting process for detecting a camera is started. Next, in step S95, it is determined whether the digital camera 406, which is placed in the area in which the wireless communication is possible, is detected. If the digital camera 406 is detected (yes in step S95) (that is, if the digital camera 406 is still placed in the area), this processing is repeated. If the digital camera is not detected (no in step S95) (that is, if the digital camera was moved outside the area), the processing proceeds to step S96. In step S96, it is notified to the STB 102 that the digital camera 406 was moved outside the area in which the wireless communication is possible and the processing returns to step S81.

Next, the operation of the digital camera 406 is described.

FIG. 12 is a flowchart illustrating exemplary operation procedures of the digital camera 406 in the second embodiment of the present invention. The program which performs the operation procedures is stored in the camera controller 11, and is executed under control of a CPU (not shown) in the camera controller 11.

First, in step S101, in order to perform the wireless communication with the lighting apparatus 401, the wireless communication unit 18 is activated. Next, in step S102, it is determined whether the digital camera 406 is put on the area in which the wireless communication is possible (that is, it is determined whether the wireless communication with the lighting apparatus 401 is possible). If the wireless communication with the lighting apparatus 401 is impossible (no in step S102), this processing is repeated. If the wireless communication with the lighting apparatus 401 is possible (yes in step S102), the processing proceeds to step S103. In step S103, by the photosensor 23 of the digital camera 406, the detection of the lighting color (light source color) irradiated from the lighting apparatus 401 is started. In this embodiment, the photosensor 23 can discriminate a blue light and a yellow light.

Next, in step S104, it is determined whether the lighting color is detected. If the lighting color is not detected (no in step S104), this processing is repeated. If the lighting color is detected (yes in step S104), the processing proceeds to step S105. In step S105, the wireless communication with the lighting apparatus 103 is established. Then, when a request of the lighting color information is received from the STB 102 via the lighting apparatus 401, the lighting color information recognized at step S104 is transmitted to the STB 102 via the lighting apparatus 401.

Next, in step S106, it is determined whether the request of the WLAN connection is received. If the request is not received (no in step S106), this processing is repeated. If the request is received (yes in step S106), the processing proceeds to step S107. In step S107, the wireless communication with the STB 102 by the WLAN is activated. Next, in step S108, it is determined whether the wireless communication with the STB 102 is established. If the wireless communication is not established (no in step S108), this processing is repeated. If the wireless communication is established (yes in step S108), the processing proceeds to step S109. In step S109, according to a request of the STB 102, the image data stored on the storage medium 20 is read, and transmitted to the STB 102. When the transmission of the image data in step S109 is completed, the processing proceeds to step S110, and the wireless communication by the WLAN is stopped.

As described above, according to the second embodiment, in the STB 102, the processing method of the image data can be changed according to the lighting color by transmitting the lighting color information recognized by the digital camera 406 to the STB 102.

Also, in step S104, in cases where the lighting color is detected, the digital camera 406 can accept the connection request by the WLAN from the STB 102. Therefore, after the digital camera 406 is certainly placed into the irradiation area of the lighting apparatus, the wireless communications between the digital camera 406 and the STB 102 can be started. Even if the possible area of the wireless communications of the digital camera 406 is broader than the irradiation areas 404, 405 of the lighting apparatus 401, operation which the user intends is realizable.

Also, it may be made for the irradiation area 404 of the light source 402 and the irradiation area 405 of the light source 403 to overlap in part. In this case, in cases where the digital camera 406 is put on the area with which the irradiation area 404 and the irradiation area 405 overlap, the optical sensor 23 of the digital camera 406 recognizes two kinds of lighting colors (blue and yellow). In that case, both the storage operation of the HDD 303 and the slide show may be performed for the image data, or completely different processes (e.g., an index display using a thumbnail image etc.) may be performed.

According to the second embodiment, the lighting color which is irradiating the digital camera 406 is detected by the photosensor 23, and the processing method of the image data of the STB 102 is changed according to the color information. As another embodiment, the lighting apparatus 401 and the lighting color of the light source corresponding to the irradiation area, on which the digital camera 406 is put, may be detected by using the imaging unit 12 of the digital camera 406.

Also, as the shape of the irradiation area of the light source 402 is different from the shape of the irradiation area of the light source 403, the shape of the irradiation area where digital camera 406 is placed may be detected by using the imaging unit 12. At this time, the STB 102 changes the processing method of image data based on the shape information of the recognized irradiation area.

Also, the light cycle of the light source 402 and the light source 403 may be different. For example, the light source 402 may emit blue light in a cycle of 1 Hz, and the light source 403 may emits yellow light in a cycle of 0.7 Hz. Then, the digital camera 406 recognizes the light cycle of the light source, and transmits the recognized light cycle information to the STB 102 via the lighting apparatus 401. Thus, the STB 102 changes the processing method of the image data based on the light cycle information.

Also, the lighting apparatus is configured so that the irradiation light of the light source 402 and the light source 403 performs an image-formation in a predetermined position, and the shape of the irradiation light which performed the image-formation is mutually different. In this case, the STB 102 changes the processing method of image data based on the shape information of the irradiation light.

In the above-described embodiment, although a plurality of lighting configurations according to the lighting forms, such as the lighting color, the irradiation shape, etc., were prepared, a plurality of kinds of lighting forms may be provided with one lighting unit. That is, a plurality of the lighting colors, such as a blue light, a red light, etc., may be changed with one lighting unit. Also, one lighting unit may be equipped with several kinds of masks for performing the mask of the irradiation light, and the irradiation shape which is different by changing the mask may be formed. Additionally, a change of the flashing cycle of the lighting unit may be enabled. The setting position of the lighting apparatus 103 or 401 may be on not only a ceiling but a wall, or a piece of furniture, such as a desk. Also, the lighting apparatus 103 or 401 may be movable to various positions by using a clip and a lighting rail.

In the second embodiment, while storing image data on the HDD 303 or while performing the slide show of the image data, it prevented transmitting image data to the STB 102 from other digital cameras. On the other hand, the invention may perform the simultaneous transfer of the image data between a plurality of digital cameras and the STB 102. In this case, after putting the first digital camera on a blue irradiation area and starting the transfer of the image data, the lighting apparatus 401 turns on the new light source in order to generate a new blue irradiation area which is adjacent to the blue irradiation area. Then, the second digital camera is put on the new blue irradiation area, and may transmit image data simultaneously with the first digital camera.

Also, in the second embodiment, the STB 102 has determined the processing method of the image data based on the color information received from the digital camera 406. As another embodiment, the digital camera 406 may determine the processing method of image data by the color information, and transmit the information which indicates the processing method to the STB 102. Then, the STB 102 may determine the processing method of the image data based on the information received from the digital camera 406. Additionally, as another embodiment, the lighting apparatus 401 may determine the processing method of the image data based on the color information. That is, the color information is received from the digital camera 406, and processing information which indicates the processing method determined according to the received color information is transmitted to the STB 102.

Also, the transmission destination of the image data transmitted from the digital camera 406 is not limited to the STB 102. For example, the printer provided with the wireless communication unit may be applicable as the transmission destination. In that case, in cases where the power supply of the printer is on, the lighting apparatus 401 generates a green irradiation area, which is adjacent to the irradiation areas 404 and 405, by using another light source. Then, when the user puts the digital camera 406 on the green irradiation area, the image data may be transmitted from the digital camera 406 and printed by the printer.

The irradiation lights of the irradiation areas 404 and 405 may perform an image-formation, and the processing method of the image data at the time of putting digital camera 406 on the irradiation area may be displayed in written form by an image-formation image, or by an icon. Thus, the user is able to more easily recognize the processing method of the image data at the time of putting a digital camera on the irradiation area.

Also, according to the above-described embodiments, when the digital camera is put on the communications area (the irradiation area), the communication unit of WLAN is activated automatically, and the image data can be transmitted. That is, it is not necessary to always make the communication unit of high power consumption, such as the WLAN, into a working state. Therefore, the power consumption can be decreased.

The present invention can be applied to an apparatus having a single device or to system including a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code.

In this case, so long as the system or apparatus has the functions of the program, the program may be executed in any form, such as object code, a program executed by an interpreter, or script data supplied to an operating system (OS).

Example of storage media that can be used for supplying the program include a floppy disk, a hard disk, an optical disk, a magneto-optical disk, a CD-ROM (compact disk-ROM), a CD-R (CD-recordable), a CD-RW (CD-rewritable), a magnetic tape, a non-volatile type memory card, a ROM, and a DVD (digital versatile disk, e.g., a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server may download, to multiple users, the program files that implement the functions of the present invention by computer.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information to install the program in the user computer.

Besides the cases where the aforementioned functions according to the embodiments are implemented by executing the read program by computer and an operating system or the like running on the computer may perform all or a part of the actual processing so that the functions of the foregoing embodiments can be implemented by this processing.

After the program is read from the storage medium it can be written to a function expansion board inserted into the computer or to a memory provided in a function expansion unit connected to the computer. A CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims the benefit of Japanese Patent Application No. 2004-325616, filed Nov. 9, 2004, which is hereby incorporated by reference herein.

What is claimed is:

1. An image processing system comprising:
   an image supply apparatus arranged to transmit image data by wireless communication;
   an image receiving apparatus arranged to receive the image data supplied from the image supply apparatus; and
   a lighting apparatus,
   wherein the lighting apparatus comprises:
      a first lighting unit arranged to illuminate an area in which communication with the image supply apparatus is possible;
      a detecting unit arranged to detect whether the image supply apparatus is in the area; and
      a controller arranged to control, in response to the detecting unit detecting the image supply apparatus in the area, to start communication between the detected image supply apparatus and the image receiving apparatus,
      wherein the controller controls lighting conditions of the first lighting unit so that a state of the image communication between the detected image supply apparatus and the image receiving apparatus can be identified.

2. An image processing system according to claim 1, wherein the first lighting unit is configured to wirelessly communicate with the image supply apparatus and the image receiving apparatus, and to directly start the wireless communication between the image supply apparatus and the image receiving apparatus.

3. An image processing system according to claim 1, wherein the first lighting unit changes a value of a lighting parameter according to the state of the image communication between the image supply apparatus and the image receiving apparatus.

4. An image processing system according to claim 1, wherein the lighting apparatus further comprises a second lighting unit, wherein the first lighting unit is turned on according to a lighting operation of the second lighting unit.

5. An image processing system according to claim 1, wherein the first lighting unit is turned on according to whether a power supply of the image receiving apparatus is on.

6. An image processing system according to claim 1, wherein the controller permits transmission of the image data from the image supply apparatus to the image receiving apparatus in cases in which the detecting unit detects that the image supply apparatus is in the area.

7. An image processing system according to claim 1, wherein the first lighting unit includes a plurality of lighting parameters,
   wherein the image supply apparatus includes a lighting parameter detecting unit arranged to detect at least one of the lighting parameters to determine whether the image supply apparatus is in the area based on at least one of the lighting parameters, and
   wherein at least one of the image supply apparatus and the image receiving apparatus changes an image processing method of the image data in accordance with an output of the lighting parameter detecting unit.

8. An image processing system according to 7, wherein the lighting parameter indicates a lighting color and the lighting parameter detecting unit detects the lighting color.

9. An image processing system according to claim 7, wherein the lighting parameter indicates a shape of the area, and the lighting parameter detecting unit detects the shape.

10. An image processing system according to claim 7, wherein the lighting parameter indicates a lighting cycle and the lighting parameter detecting unit detects the lighting cycle.

11. An image processing system according to claim 7, wherein the first lighting unit includes a plurality of lighting devices and a value of at least one of the lighting parameters is different in each of the plurality of the lighting devices.

12. An image processing system according to claim 1, wherein the first lighting unit changes a value of a lighting parameter in accordance with an output of the detecting unit.

13. A controlling method of an image processing system which includes an image supply apparatus arranged to transmit image data by wireless communication, an image receiving apparatus arranged to receive the image data supplied from the image supply apparatus, and a lighting apparatus that includes a first lighting unit, the controlling method comprising steps of:
   an illuminating step of illuminating, using the first lighting unit, an area in which communication with the image supply apparatus is possible;
   a detecting step of detecting whether the image supply apparatus is in the area; and
   a controlling step of controlling, in response to the detecting step detecting the image supply apparatus in the area, to start communication between the detected image supply apparatus and the image receiving apparatus,
   wherein the controlling step controls lighting conditions of the first lighting unit so that a state of the image communication between the detected image supply apparatus and the image receiving apparatus can be identified.

14. A controlling method according to claim 13, further comprising:
   a changing step of changing a value of a lighting parameter in accordance with the state of the image communication between the image supply apparatus and the image receiving apparatus.

15. A controlling method according to claim 13, wherein the lighting apparatus further includes a second lighting unit, and
   wherein the method further comprising a lighting step of turning on the first lighting unit according to a lighting operation of the second lighting unit.

16. A controlling method according to claim 13, further comprising a lighting step of turning on the first lighting unit according to whether a power supply of the image receiving apparatus is on.

17. A controlling method according to claim 13,
   wherein the controlling step permits transmission of the image data from the image supply apparatus to the image receiving apparatus in cases where, in the detecting step, it is detected that the image supply apparatus is in the area.

18. A controlling method according to claim 13, wherein the first lighting unit has a plurality of lighting parameters, and wherein the method further comprises:

a lighting parameter detecting step of detecting at least one of the lighting parameters to determine whether the image supply apparatus is in the area based on at least one of the lighting parameters, and a changing step of changing an image processing method of at least one of the image supply apparatus and the image receiving apparatus in accordance with a result of the lighting parameter detecting step.

19. A controlling method according to claim 18, wherein the lighting parameter indicates a lighting color and the lighting parameter detecting step detects the lighting color.

20. A controlling method according to claim 18, wherein the lighting parameter indicates a shape of the area, and the lighting parameter detecting step detects the shape.

21. A controlling method according to claim 18, wherein the lighting parameter indicates a lighting cycle and the lighting parameter detecting step detects the lighting cycle.

22. A controlling method according to claim 13, further comprising a changing step of changing a lighting parameter of the first lighting unit in accordance with a result of the detecting step.

23. A non-transitory computer-readable medium storing thereon a computer-executable program for causing a computer to perform the controlling method according to claim 13.

24. A non-transitory computer-readable storage medium for storing program code for the controlling method according to claim 13.

25. A lighting apparatus comprising:

a first communication unit arranged to communicate with an image supply apparatus which can transmit which transmits image data to an image receiving apparatus;

a lighting unit arranged to illuminate an area in which communication with the image supply apparatus is possible; and a detecting unit arranged to detect whether the image supply apparatus is in the area and a controller arranged to control, in response to the detecting unit detecting the image supply apparatus in the area, to start communication between the detected image supply apparatus and the image receiving apparatus, wherein the controller controls lighting conditions so that a state of communication between the image supply apparatus and the image receiving apparatus can be identified.

26. A controlling method of controlling a lighting apparatus comprising steps of:

a communicating step of establishing communication between the lighting apparatus and an image supply apparatus which can transmit image data to an image receiving apparatus;

an illuminating step of illuminating an area in which communication with the image supply apparatus is possible; and a detecting step of detecting whether the image supply apparatus is in the area; and a controlling step of controlling to, in response to the detecting step detecting the image supply apparatus in the area, start communication between the detected image supply apparatus and the image receiving apparatus, wherein the controls lighting conditions so that a state of communication between the image supply apparatus and the image receiving apparatus can be identified.

27. A non-transitory computer-readable medium storing thereon a computer-executable program for causing a computer to perform the controlling method according to claim 26.

28. A non-transitory computer-readable storage medium for storing program code for the controlling method according to claim 26.

29. A lighting apparatus according to claim 25, wherein the detecting unit detects weather the image supply apparatus is in the area or not in accordance with the communication between the first communication unit and the image supply apparatus.

30. A lighting apparatus according to claim 25, further comprising;

a second communication unit arranged to communicate with the image receiving apparatus, wherein the communication between the image receiving apparatus and the image supply apparatus starts in response to the second communication unit informing the image receiving apparatus that the detecting unit has detected the image supply apparatus in the area.

31. A lighting apparatus according to claim 25, wherein a communication method of the first communication unit between the lighting apparatus and the image supply apparatus is different from a communication method between the image supply apparatus and the image receiving apparatus.

* * * * *